US011959657B2

(12) United States Patent
Ouellette

(10) Patent No.: US 11,959,657 B2
(45) Date of Patent: Apr. 16, 2024

(54) METHODS AND APPARATUSES FOR CONTROLLING HVAC FOR USER COMFORT USING HEAT SIGNALS

(71) Applicant: Johnson Controls Tyco IP Holdings LLP, Milwaukee, WI (US)

(72) Inventor: Jason M. Ouellette, Sterling, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/455,143

(22) Filed: Nov. 16, 2021

(65) Prior Publication Data

US 2023/0151994 A1 May 18, 2023

(51) Int. Cl.
F24F 11/64 (2018.01)
G05D 23/19 (2006.01)
F24F 110/10 (2018.01)
F24F 110/12 (2018.01)

(52) U.S. Cl.
CPC .......... *F24F 11/64* (2018.01); *G05D 23/1917* (2013.01); *F24F 2110/10* (2018.01); *F24F 2110/12* (2018.01)

(58) Field of Classification Search
CPC .... F24F 11/64; F24F 2110/10; F24F 2110/12; F24F 11/30
See application file for complete search history.

(56) References Cited

U.S. PATENT DOCUMENTS

| 2005/0157772 A1* | 7/2005 | Fischer | B60H 1/00792 |
| | | | 374/131 |
| 2007/0056299 A1* | 3/2007 | Shankweiler | G05D 23/32 |
| | | | 62/157 |
| 2010/0262298 A1* | 10/2010 | Johnson | F24F 11/62 |
| | | | 700/277 |
| 2013/0119042 A1* | 5/2013 | Eisenhour | B60H 1/00 |
| | | | 219/202 |

(Continued)

FOREIGN PATENT DOCUMENTS

DE 102013208687 A1 * 11/2014 ............... H04N 5/33
DE 102016206267 A1 10/2017

(Continued)

OTHER PUBLICATIONS

International Search Report and Written Opinion in PCT/US2022/079894, dated Feb. 21, 2023, 12 pages.

*Primary Examiner* — Alicia M. Choi
(74) *Attorney, Agent, or Firm* — ARENTFOX SCHIFF LLP

(57) ABSTRACT

Aspects of the present disclosure include methods, systems, and non-transitory computer readable media for receiving at least one calibration heat signal from a calibration device, wherein the at least one calibration heat signal corresponds to a calibration temperature known to the controller, receiving a plurality of heat signals from a plurality of sources in the building, determining a plurality of temperatures associated with the plurality of heat signals based on the at least one calibration heat signal and the calibration temperature, (Continued)

determining an internal target temperature of the building based on the plurality of temperatures, and transmitting, to the HVAC system, a control signal indicating the internal target temperature.

16 Claims, 3 Drawing Sheets

(56) References Cited

U.S. PATENT DOCUMENTS

| | | | | |
|---|---|---|---|---|
| 2015/0172567 | A1* | 6/2015 | Ekeroth | H04N 23/11 |
| | | | | 348/82 |
| 2015/0204560 | A1* | 7/2015 | Takahashi | F24F 11/30 |
| | | | | 165/208 |
| 2015/0338117 | A1* | 11/2015 | Henneberger | G05B 15/02 |
| | | | | 700/276 |
| 2016/0018123 | A1* | 1/2016 | Yabunouchi | F24F 11/64 |
| | | | | 700/278 |
| 2016/0033178 | A1* | 2/2016 | Chuah | H05K 7/207 |
| | | | | 62/236 |
| 2016/0320081 | A1* | 11/2016 | Nikovski | F24F 11/30 |
| 2017/0197489 | A1* | 7/2017 | Prakah-Asante | B60H 1/00807 |
| 2017/0343226 | A1* | 11/2017 | Hsiao | F24F 5/0035 |
| 2017/0363304 | A1* | 12/2017 | Hsiao | F24F 5/0042 |
| 2020/0263894 | A1* | 8/2020 | Oobayashi | F24F 11/79 |
| 2020/0346517 | A1* | 11/2020 | Han | B60H 1/034 |
| 2022/0388372 | A1* | 12/2022 | Yang | B60H 1/2225 |

FOREIGN PATENT DOCUMENTS

| | | | | |
|---|---|---|---|---|
| WO | WO-2022017818 A1 | * | 1/2022 | |
| WO | WO-2022023748 A1 | * | 2/2022 | A61B 5/015 |

* cited by examiner

METHODS AND APPARATUSES FOR CONTROLLING HVAC FOR USER COMFORT USING HEAT SIGNALS

TECHNICAL FIELD

Aspects of the present disclosure relates to controlling an internal temperature of a building via one or more HVAC systems.

BACKGROUND

In some environments, a building may have one or more heating, ventilation, and air conditioning (HVAC) systems that controls the internal temperature of the building. The one or more HVAC systems may be manually turned on or off, or set to reach a specific desired temperature. The operations of the one or more HVAC systems may impact the comforts of the occupants of the building and/or the operational costs of the building. Therefore, it may be desirable to control the internal temperature.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods, systems, and non-transitory computer readable media for receiving at least one calibration heat signal from a calibration device, wherein the at least one calibration heat signal corresponds to a calibration temperature known to the controller, receiving a plurality of heat signals from a plurality of sources in the building, determining a plurality of temperatures associated with the plurality of heat signals based on the at least one calibration heat signal and the calibration temperature, determining an internal target temperature of the building based on the plurality of temperatures, and transmitting, to the heating, ventilation, and air conditioning (HVAC) system, a control signal indicating the internal target temperature.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

Aspects of the present disclosure may include a controller that control a heating, ventilation, and air conditioning (HVAC) system in a building. The controller may receive, via a sensing device, a calibration heat signal from a calibration device. The calibration heat signal may correspond to a calibration temperature known to the controller. The controller may calibrate the sensing device using the calibration heat signal and/or the calibration temperature. After the calibration process, the controller may receive, via the sensing device, heat signals from multiple sources in the building. Based on the heat signals, the controller may determine temperatures associated with the heat signals. The controller may determine an internal target temperature for the building based on the temperatures associated with the heat signals. The controller may transmit a control signal to the HVAC system indicating the internal target temperature. The HVAC system may raise and/or lower the temperatures in the building to be closer to the internal target temperature.

Figure 1:
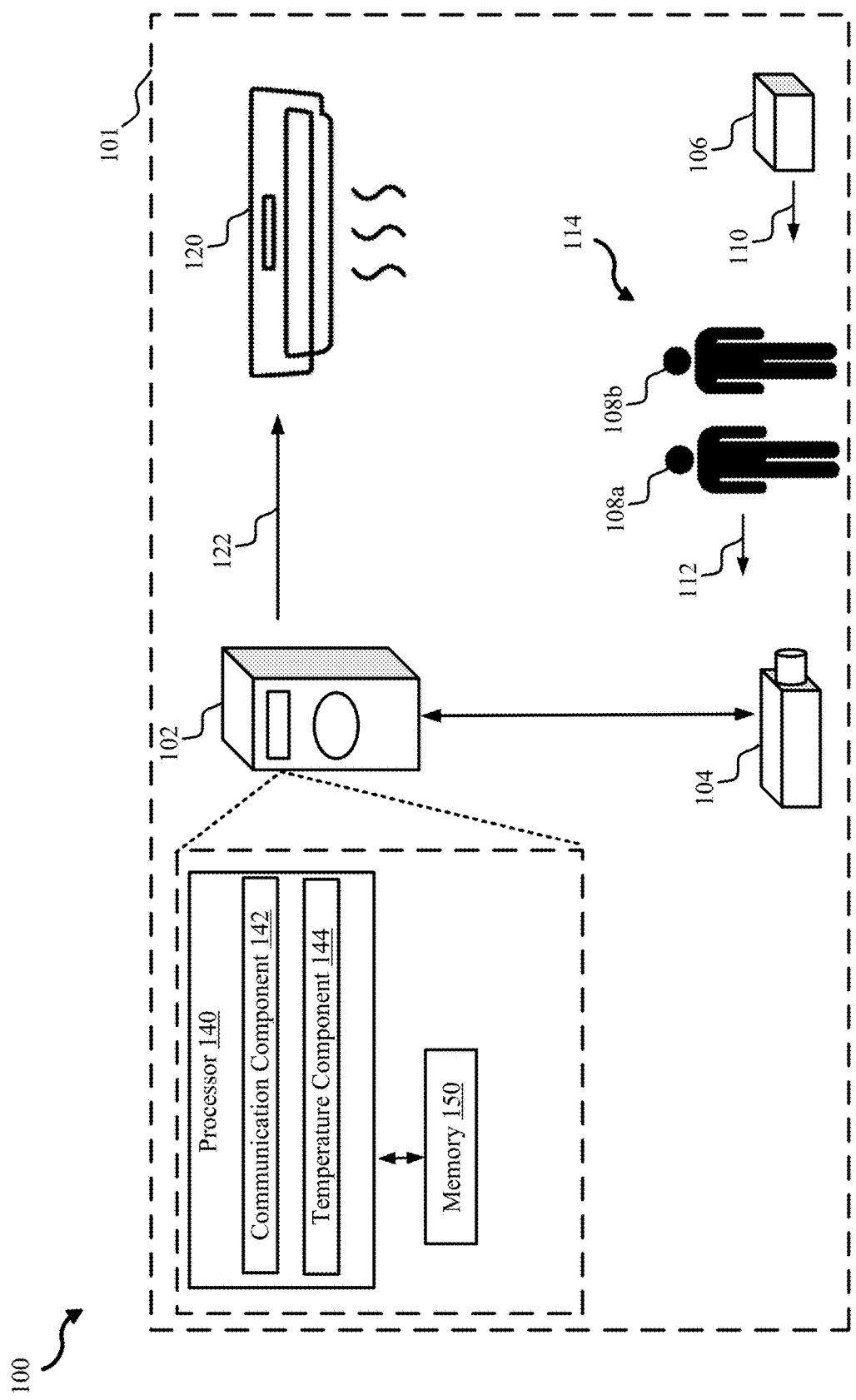
FIG. 1 illustrates an example of an environment for controlling a HVAC in accordance with aspects of the present disclosure.

Referring to FIG. 1, in an aspect of the present disclosure, an example of an environment 100 for controlling a HVAC system 120 is shown according to aspects of the present disclosure. The environment 100 may be include a building 101 having optional occupants 108*a*, 108*b*. The environment 100 may include a controller 102 configured to control the HVAC system 120. The environment 100 may include a sensing device 104 configured to detect heat signals from sources within the building 101. The sensing device 104 may be a thermal sensor, a thermal imaging device such as a thermal camera, or other types of thermal imaging devices. The environment 100 may include a calibration device 106 configured to provide a calibration heat signal to the sensing device 104 for calibrating the controller 102 and/or the sensing device 104. The environment 100 may include the HVAC system 120 that regulates one or more of the temperature, humidity, air flow, or other environmental parameters of the environment 100. The controller 102 may include a processor 140 that executes instructions stored in a memory 150 for performing the functions described herein.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, controllers, digital signal processors (DSPs), field programmable gate arrays (FPGAs), programmable logic devices (PLDs), state machines, gated logic, discrete hardware circuits, and other suitable hardware configured to perform the various functionality described herein.

In some aspects, the controller 102 may include memory 150. The memory 150 may include software instructions and/or hardware instructions. The processor 140 may execute the instructions to implement aspects of the present disclosure.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

In certain aspects, the processor 140 may include a communication component 142 configured to communicate with external devices via one or more wired and/or wireless connections (not shown). The processor 140 may include a temperature component 144 configured to convert received heat signals to temperatures and/or determine an internal target temperature.

During operation, in certain aspects, the calibration device 106 may emit one or more calibration heat signals 110. The one or more calibration heat signals 110 may be associated with one or more one or more calibration temperatures known to the controller 102 and/or the sensing device 104. The calibration device 106 may transmit a signal indicating the one or more calibration temperatures, or the controller 102 and/or the sensing device 104 may be pre-configured with the one or more calibration temperatures. The calibration device 106 may be a black body radiator. For example, the calibration device 106 may emit the one or more calibration heat signals 110 associated with 0° C., 10° C., 20° C., 30° C., and 40° C. Alternative or additionally, the calibration device 106 may emit the one or more calibration heat signals 110 associated with 30° F., 50° F., 70° F., 90° F., and 110° F. Other temperatures and/or temperature ranges are possible.

In certain aspects, the sensing device 104 may receive the one or more calibration heat signals 110. The sensing device 104 may utilize the one or more calibration heat signals 110 for calibration (e.g., tuning electronics within the sensing device 104 and/or adjusting offsets for a lookup table associating heat signals and temperatures). In some aspects, the controller 102 may perform the calibration described above.

In some aspects of the present disclosure, the sensing device 104 may receive heat signals 112 from sources 114. The sources 114 may include the occupants 108a, 108b, clothes and/or accessories of the occupants 108a, 108b, fixtures in the building 101, or other items. The sensing device 104 and/or the controller 102 may determine the temperatures associated with the heat signals 112 (e.g., 37° C., 98° F., 30° C., etc.). Based on the temperatures (and after the calibration described above), the controller 102 may determine an internal target temperature for the building 101. For example, the controller 102 may calculate a mean temperature, a median temperature, and/or a mode temperature based on the temperatures associated with the heat signals 112. The controller 102 may determine the internal target temperature using one or more of the mean temperature, the median temperature, and/or the mode temperature. In one example, if the controller 102 calculates a mean temperature of 100° F. (indicating hot weather outside the building 101), the controller 102 may determine an internal target temperature of 75° F.

In an aspect, the controller 102 may transmit a control signal 122 indicating the internal target temperature to the HVAC system 120. The HVAC system 120 may activate the heating, ventilation, or air conditioning to adjust the temperature in the building toward the internal target temperature. In alternative aspects, the building 101 may include multiple controllers, sensing devices, calibration devices, and/or HVAC systems.

Figure 2:
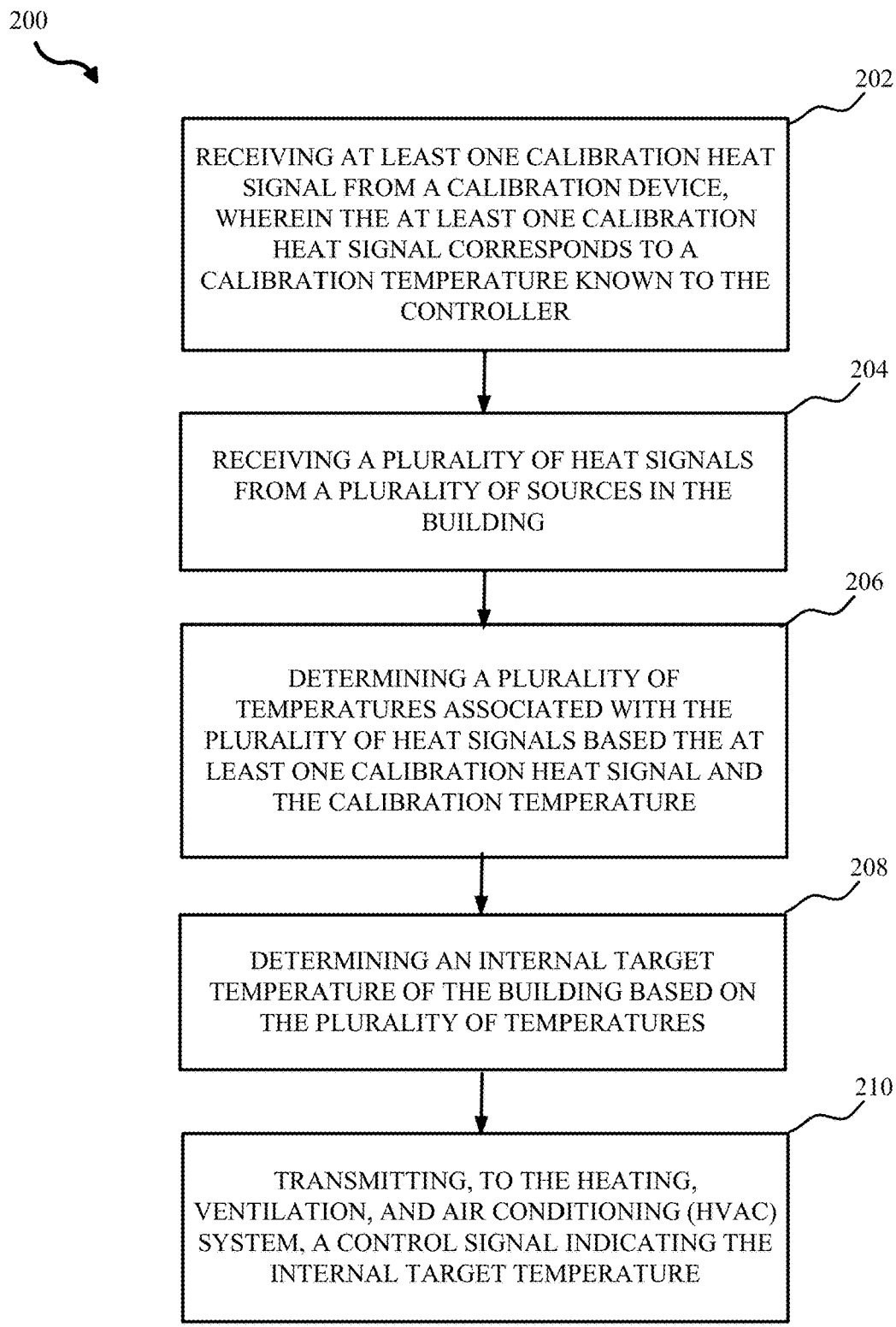
FIG. 2 illustrates an example method for controlling a HVAC in accordance with aspects of the present disclosure.

Turning to FIG. 2, an example of a method 200 for controlling one or more HVAC systems may be implemented by the controller 102, the sensing device 104, the processor 140, the communication component 142, the temperature component 144, and/or the memory 150. One or more of the controller 102, the sensing device 104, the processor 140, the communication component 142, the temperature component 144, and/or the memory 150 may be configured to or provide means for implementing aspects of the method 200.

At block 202, the method 200 may receive at least one calibration heat signal from a calibration device, wherein the at least one calibration heat signal corresponds to a calibration temperature known to the controller. The controller 102, the sensing device 104, the processor 140, the communication component 142, the temperature component 144, and/or the memory 150 may be configured to or provide means for receiving at least one calibration heat signal from a calibration device, wherein the at least one calibration heat signal corresponds to a calibration temperature known to the controller.

At block 204, the method 200 may receive a plurality of heat signals from a plurality of sources in the building. The controller 102, the sensing device 104, the processor 140, the communication component 142, the temperature component 144, and/or the memory 150 may be configured to or provide means for receiving a plurality of heat signals from a plurality of sources in the building. Examples of the sources may include occupants, accessories and/or clothing of the occupants, fixtures, furniture, and/or other items in the building 101.

At block 206, the method 200 may determine a plurality of temperatures associated with the plurality of heat signals based on the at least one calibration heat signal and/or the calibration temperature. The controller 102, the sensing device 104, the processor 140, the temperature component 144, and/or the memory 150 may be configured to or provide means for determining a plurality of temperatures associated with the plurality of heat signals based on the at least one calibration heat signal and the calibration temperature.

At block 208, the method 200 may determine an internal target temperature of the building based on the plurality of temperatures. The controller 102, the sensing device 104, the processor 140, the temperature component 144, and/or the memory 150 may be configured to or provide means for determining an internal target temperature of the building based on the plurality of temperatures.

At block 210, the method 200 may transmit, to the heating, ventilation, and air conditioning (HVAC) system, a control signal indicating the internal target temperature. The controller 102, the processor 140, the communication component 142, and/or the memory 150 may be configured to or provide means for transmitting, to the heating, ventilation, and air conditioning (HVAC) system, a control signal indicating the internal target temperature.

Aspects of the present disclosure includes the method above, wherein determining the internal target temperature comprises calculating a mean temperature, a median temperature, or a mode temperature of the plurality of temperatures and determining the internal target temperature based on one or more of the mean temperature, the median temperature, or the mode temperature.

Aspects of the present disclosure includes any of the methods above, further comprising calibrating, prior to receiving the plurality of heat signals, the controller based on the at least one calibration heat signal and the calibration temperature.

Aspects of the present disclosure includes any of the methods above, wherein determining the internal target temperature comprises receiving information relating to one or more of an outdoor temperature, a current indoor temperature in the building, or a time and determining the internal target temperature based on the one or more of the outdoor temperature, the current indoor temperature in the building, or the time. For example, the controller 102 may receive, via the communication component 140, the outdoor and/or indoor temperature from an external/internal thermostat in communication with the controller 102. The controller 102 may obtain the time from an internal clock.

Aspects of the present disclosure includes any of the methods above, wherein receiving the plurality of heat signals comprises receiving the plurality of heat signals from different locations in the building.

Figure 3:
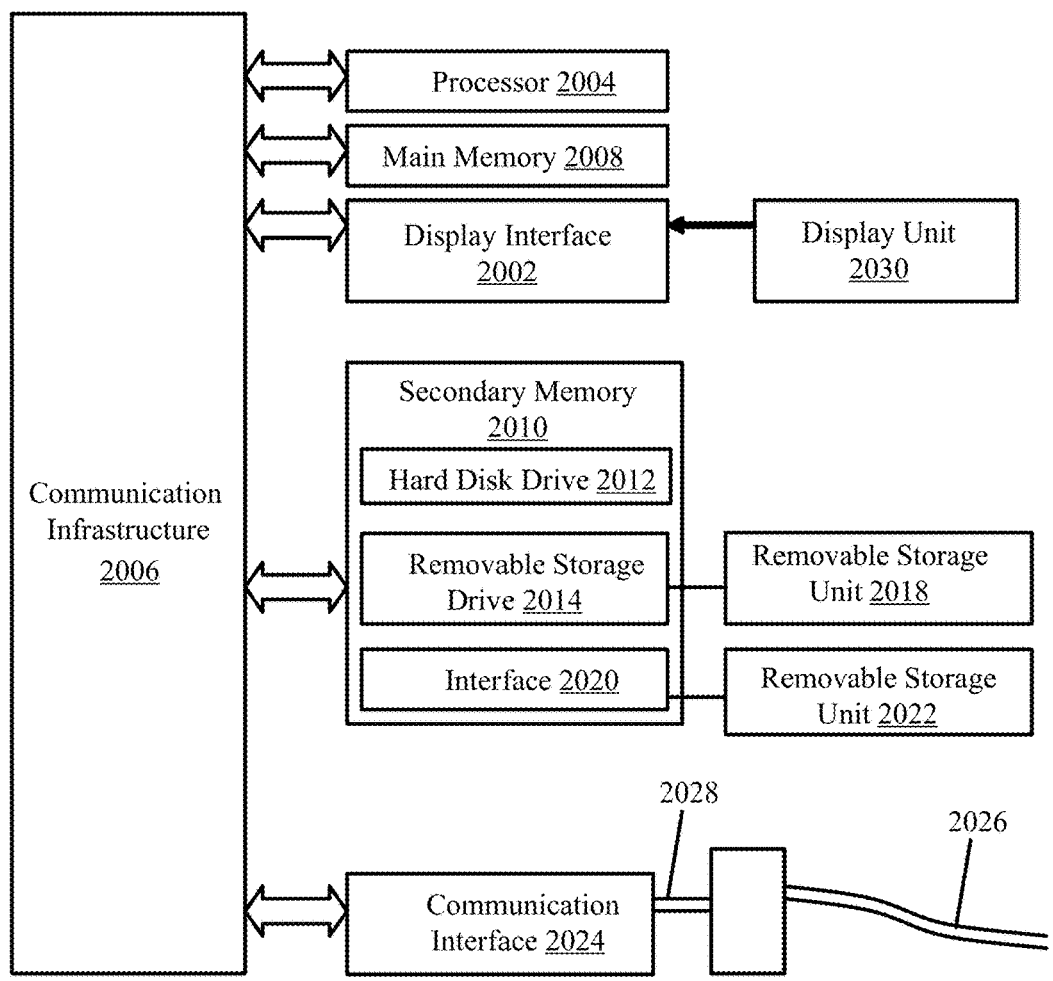
FIG. 3 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 2000 is shown in FIG. 3. In some examples, the controller 102 and/or the sensing device 104 may be implemented as the computer system 2000 shown in FIG. 3. The controller 102 and/or the sensing device 104 may include some or all of the components of the computer system 2000.

The computer system 2000 includes one or more processors, such as processor 2004. The processor 2004 is connected with a communication infrastructure 2006 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data. In some examples, one or more of the main memory 2008, the secondary memory 2010, the removable storage unit 2018, and/or the removable storage unit 2022 may be a non-transitory memory.

Alternative aspects of the present disclosures may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and the removable storage unit 2022 and the interface 2020, which allow software and data to be transferred from the removable storage unit 2022 to computer system 2000.

Computer system 2000 may also include a communications circuit 2024. The communications circuit 2024 may allow software and data to be transferred between computer system 2000 and external devices. Examples of the communications circuit 2024 may include a modem, a network interface (such as an Ethernet card), a communications port, a Personal Computer Memory Card International Association (PCMCIA) slot and card, etc. Software and data transferred via the communications circuit 2024 are in the form of signals 2028, which may be electronic, electromagnetic, optical or other signals capable of being received by the communications circuit 2024. These signals 2028 are provided to the communications circuit 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as the removable storage unit 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications circuit 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard disk drive 2012, or the interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for controlling a heating, ventilation, and air conditioning (HVAC) system in a building by a controller, comprising:
   receiving at least one calibration heat signal radiating from a calibration device, wherein the at least one calibration heat signal corresponds to a calibration temperature known to the controller;
   receiving a plurality of heat signals from a plurality of sources in the building;
   determining a plurality of temperatures associated with the plurality of heat signals based on the at least one calibration heat signal and the calibration temperature;
   determining an internal target temperature of the building based on the plurality of temperatures; and
   transmitting, to the HVAC system, a control signal indicating the internal target temperature for the HVAC system to raise or lower an internal temperature toward the internal target temperature.

2. The method of claim 1, wherein determining the internal target temperature comprises:
   calculating a mean temperature, a median temperature, or a mode temperature of the plurality of temperatures; and
   determining the internal target temperature based on one or more of the mean temperature, the median temperature, or the mode temperature.

3. The method of claim 1, further comprising calibrating, prior to receiving the plurality of heat signals, the controller based on the at least one calibration heat signal and the calibration temperature.

4. The method of claim 1, wherein determining the internal target temperature comprises:
   receiving information relating to one or more of an outdoor temperature, a current indoor temperature in the building, or a time; and
   determining the internal target temperature based on the one or more of the outdoor temperature, the current indoor temperature in the building, or the time.

5. The method of claim 1, wherein receiving the plurality of heat signals comprises receiving the plurality of heat signals from different locations in the building.

6. The method of claim 1, wherein the at least one calibration heat signal includes a plurality of calibration heat signals associated with a plurality of calibration temperatures.

7. A controller for controlling a heating, ventilation, and air conditioning (HVAC) system in a building, comprising:
   a memory including instructions; and
   a processor communicatively coupled to the memory and configured to execute the instructions to:
      receive, via a sensing device, at least one calibration heat signal radiating from a calibration device, wherein the at least one calibration heat signal corresponds to a calibration temperature known to the controller;
      receive, via the sensing device, a plurality of heat signals from a plurality of sources in the building;
      determine a plurality of temperatures associated with the plurality of heat signals based on the at least one calibration heat signal and the calibration temperature;
      determine an internal target temperature of the building based on the plurality of temperatures; and
      transmit, to the HVAC system, a control signal indicating the internal target temperature for the HVAC system to raise or lower an internal temperature toward the internal target temperature.

8. The controller of claim 7, wherein determining the internal target temperature comprises:
   calculating a mean temperature, a median temperature, or a mode temperature of the plurality of temperatures; and
   determining the internal target temperature based on one or more of the mean temperature, the median temperature, or the mode temperature.

9. The controller of claim 7, wherein the processor is further configured to calibrate, prior to receiving the plurality of heat signals, the controller based on the at least one calibration heat signal and the calibration temperature.

10. The controller of claim 7, wherein determining the internal target temperature comprises:
    receiving information relating to one or more of an outdoor temperature, a current indoor temperature in the building, or a time; and
    determining the internal target temperature based on the one or more of the outdoor temperature, the current indoor temperature in the building, or the time.

11. The controller of claim 7, wherein receiving the plurality of heat signals comprises receiving the plurality of heat signals from different locations in the building.

12. A non-transitory computer readable medium including instructions that, when executed by a processor of a controller for controlling a heating, ventilation, and air conditioning (HVAC) system in a building, cause the processor to:
    receive at least one calibration heat signal radiating from a calibration device, wherein the at least one calibration heat signal corresponds to a calibration temperature known to the controller;
    receive a plurality of heat signals from a plurality of sources in the building;
    determine a plurality of temperatures associated with the plurality of heat signals based on the at least one calibration heat signal and the calibration temperature;
    determine an internal target temperature of the building based on the plurality of temperatures; and
    transmit, to the HVAC system, a control signal indicating the internal target temperature for the HVAC system to raise or lower an internal temperature toward the internal target temperature.

13. The non-transitory computer readable medium of claim 12, wherein the instructions for determining the internal target temperature comprises instructions for:
    calculating a mean temperature, a median temperature, or a mode temperature of the plurality of temperatures; and
    determining the internal target temperature based on one or more of the mean temperature, the median temperature, or the mode temperature.

14. The non-transitory computer readable medium of claim 12, further comprising instructions for calibrating, prior to receiving the plurality of heat signals, the controller based on the at least one calibration heat signal and the calibration temperature.

15. The non-transitory computer readable medium of claim 12, wherein the instructions for determining the internal target temperature comprises instructions for:
    receiving information relating to one or more of an outdoor temperature, a current indoor temperature in the building, or a time; and
    determining the internal target temperature based on the one or more of the outdoor temperature, the current indoor temperature in the building, or the time.

16. The non-transitory computer readable medium of claim 12, wherein the instructions for receiving the plurality of heat signals comprises instructions for receiving the plurality of heat signals from different locations in the building.

\* \* \* \* \*